2,832,193

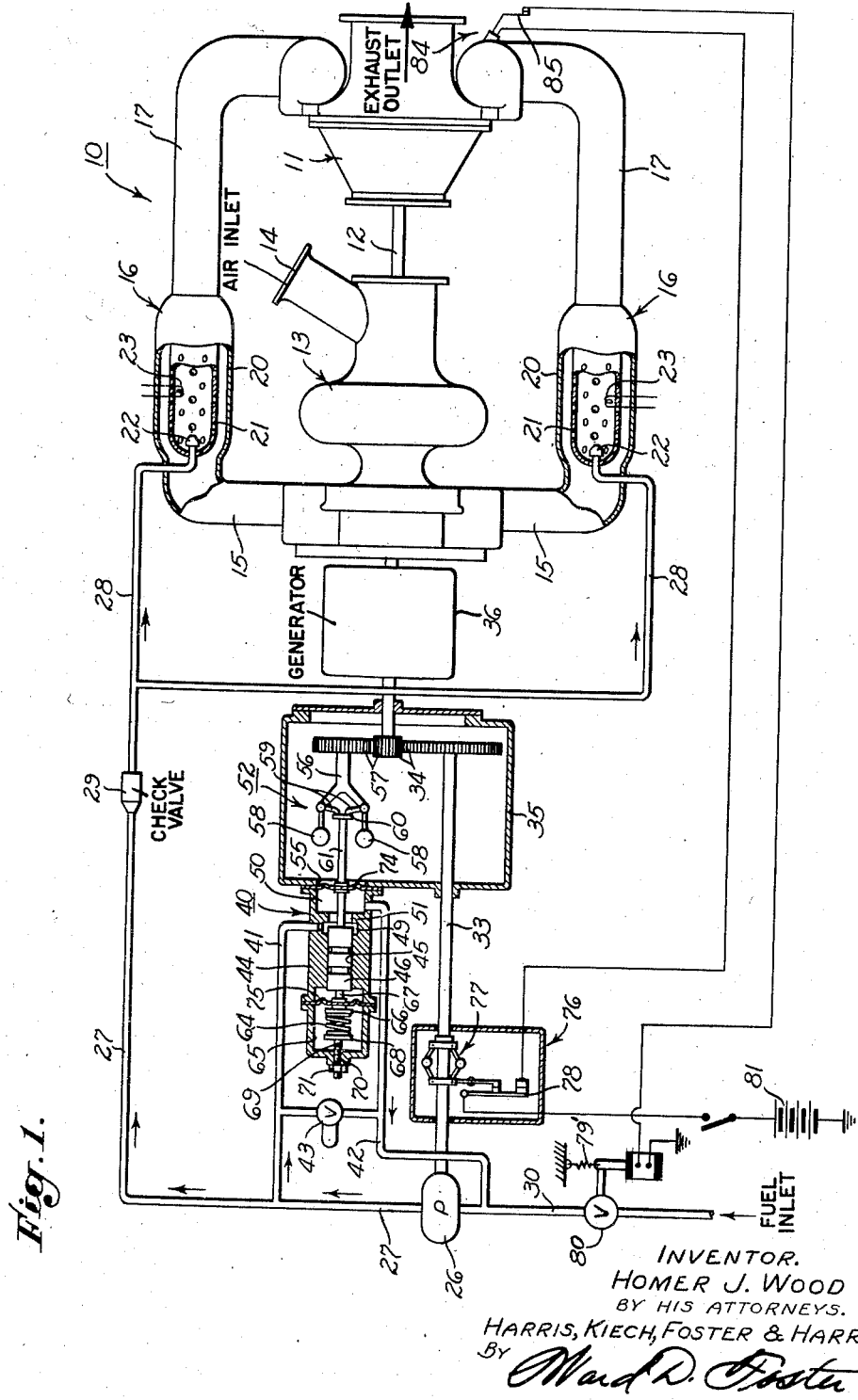

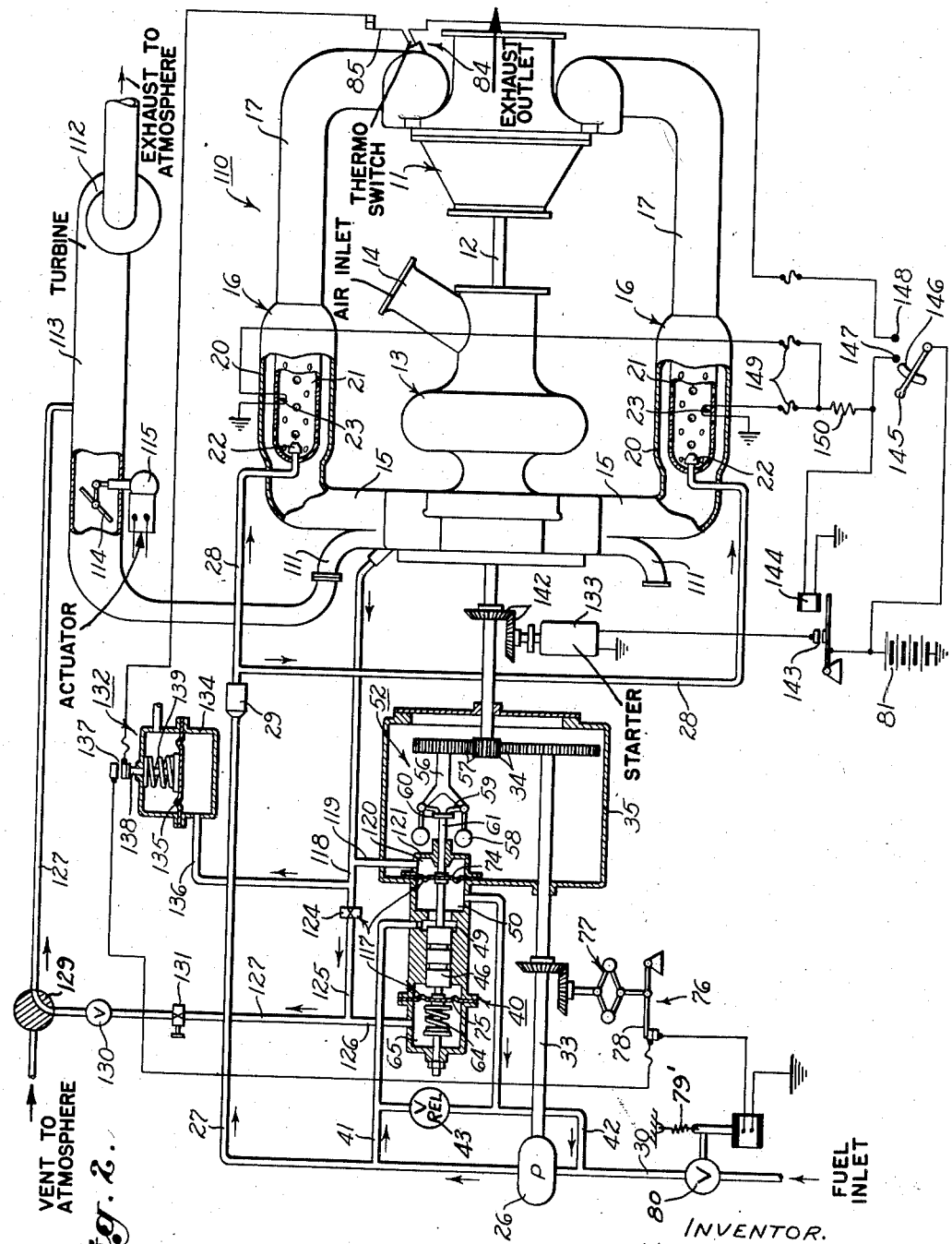

GAS TURBINE FUEL CONTROL SYSTEM RESPONSIVE TO SPEED AND COMPRESSOR LOAD

Homer J. Wood, Sherman Oaks, Calif., assignor to The Garrett Corporation, Los Angeles, Calif., a corporation of California Application September 4, 1948, Serial No. 47,828

4 Claims. (Cl. 60—39.07)

My invention relates in general to engine control systems and since it has particular utility when embodied in a control system for regulating the operation of a gas turbine, I prefer to consider the invention in this connection herein for convenience in disclosing same. However, as will be apparent to those skilled in the art, various features of the invention are susceptible of other applications and it will be understood that I do not desire to be limited to the specific application disclosed hereinafter.

Before considering the present invention in detail, it is convenient to outline briefly the basic elements of an engine of the type under consideration, an example of such an engine being disclosed in my Patent No. 2,648,491, issued August 11, 1953, reference to which is hereby made. As disclosed in the aforesaid Patent No. 2,648,491, an engine of this character comprises a turbine having an air compressor and a combustion chamber associated therewith, the compressor being driven by the turbine and delivering compressed air to the combustion chamber. In the combustion chamber, a suitable fuel is burned in the compressed air to increase the enthalpy thereof to the desired energy level. The compressed air energized in the combustion chamber in this manner is delivered to the turbine to operate the latter. With such an arrangement, part of the power developed in the turbine is devoted to compressing the air required for its operation, and the remainder is available to perform useful work.

The power available for use may be transmitted from the turbine to a device to be driven thereby in various ways, two of which are disclosed in my aforesaid copending application and are considered in more detail hereinafter. For example, power may be transmitted from the turbine to the device to be driven thereby by employing part of the compressed air discharged by the compressor for operating an air turbine or other apparatus which is connected to the device to be driven. As another example, the turbine may be directly connected to the device to be driven. In the first instance, the power available for performing useful work may be said to be transmitted pneumatically and, in the second instance, it may be said to be transmitted mechanically. Power may also be transmitted from the turbine to a device to be driven in various other ways, as will be apparent to those skilled in the art.

In operating an engine of the foregoing character, it is desirable to maintain the speed of the turbine within relatively close limits in order to attain maximum operating efficiency, and it is essential to maintain the speed of the turbine below a predetermined maximum value at all times in order to avoid damage which may result from over-speeding. As will be understood by those skilled in the art, variations in turbine speed may arise from variations in the load placed on the turbine.

It is therefore a primary object of the invention to provide a control system which is adapted to vary the power delivered by the turbine in response to variations in the load on the turbine while maintaining the speed of the turbine substantially constant.

More specifically, an object of my invention is to provide a control system for maintaining the turbine speed substantially constant which includes means responsive to variations in the speed of the turbine for varying the rate of delivery of fuel to the combustion chamber inversely with variations in turbine speed. Thus, the speed responsive means maintains the speed of the turbine susbtantially constant by regulating the rate at which fuel is delivered to the combustion chamber.

An important object of the invention is to provide a control system of the foregoing character which is adapted to operate the turbine at a predetermined idling speed under conditions of reduced load, and which is adapted to maintain the speed of the turbine at a substantially constant operating level under conditions of varying load. By causing the turbine to idle at low or reduced load, fuel economy and increased life expectancy for the turbine are attained.

Another object is to provide a control system of the character set forth in the preceding paragraph which includes pressure responsive means for varying the rate of delivery of fuel to the combustion chamber with variations in the load on the turbine.

Another important object is to provide a control system wherein the aforementioned pressure responsive means modulates the action of the speed responsive means in a manner to cause the turbine to idle under conditions of reduced load.

Still another object of my invention is to provide a control system which includes by-pass valve means connected in parallel with a pump for delivering fuel to the combustion chamber, the aforesaid speed responsive means and pressure responsive means being adapted to operate the by-pass valve means to regulate the rate of flow of fuel to the combustion chamber. More specifically, it is an object to provide a control system wherein the speed responsive means operates the by-pass valve means to increase the rate at which fuel is by-passed in response to an increase in turbine speed and to decrease the rate at which fuel is by-passed in response to a decrease in turbine speed. Again more specifically, it is an object to provide a control system wherein the pressure responsive means operates the by-pass valve means to increase the rate at which fuel is by-passed in response to a decrease in the load on the turbine, and to decrease the rate at which fuel is by-passed in response to an increase in the load on the turbine. As will be apparent, an increase in the fuel by-passing rate will result in a decrease in the rate of delivery of fuel to the combustion chamber and, conversely, a decrease in the fuel by-passing rate will result in an increase in the rate of delivery of fuel to the combustion chamber.

Another object of the invention is to provide a control system wherein the by-pass valve means includes a valve member which is movable between open and closed positions under the control of the speed responsive means and the pressure responsive means.

An important object is to provide a by-pass valve means in which the valve member is spring-biased and in which the pressure responsive means in effect modulates the spring force applied to the valve member.

Another object is to provide means for adjusting the spring force applied to the by-pass valve member independently of the action of the pressure responsive means.

A further object is to provide a control system wherein the pressure responsive means comprises diaphragm means connected to the by-pass valve member and comprises means for applying to the diaphragm means a pressure differential which is variable with the load on the turbine.

An important object is to provide means for modulating the pressure differential applied to the aforementioned diaphragm means to permit varying the level at which the turbine speed is maintained.

Another object is to provide a control system having means responsive to the temperature of the highly energized compressed air or power air supplied to the turbine for interrupting the delivery of fuel to the combustion chamber whenever the temperature of the power air exceeds a predetermined maximum value.

Another object of the invention is to provide means for interrupting delivery of fuel to the combustion chamber in the event that the turbine overspeeds above a predetermined maximum value for any reason.

Another object is to provide a control system having means for preventing delivery of fuel to the combustion chamber during starting of the engine until such time as the compressor discharge pressure rises above a predetermined minimum value sufficient to insure proper combustion of the fuel in the combustion chamber.

I prefer to provide a cut-off valve which is connected in series with the pump and which is adapted to be held open by a solenoid when the latter is energized, additional objects of the invention being to provide a control system wherein the means for interrupting fuel flow in response to an excessive temperature of the power air is adapted to open a switch in series with the solenoid, wherein the means for interrupting fuel flow in response to an excessive turbine speed is adapted to open another switch in series with the solenoid, and wherein the means for preventing fuel flow until a predetermined compressor discharge pressure is attained is adapted to close still another switch in series with the same solenoid.

The foregoing objects and advantages of my invention, together with various other objects and advantages thereof which will become apparent, may be attained through the employment of the exemplary embodiments which are illustrated in the accompanying drawings and which are described in detail hereinafter. Referring to the drawings:

Fig. 1 is a semi-diagrammatic view illustrating one embodiment of a control system of the invention; and Fig. 2 is a semi-diagrammatic view illustrating another embodiment thereof.

Referring to Fig. 1 of the drawings, I show an engine, indicated generally by the numeral 10, with which the control system of the present invention may be employed particularly advantageously, the engine 10 being generally similar to that disclosed in my aforesaid copending application. In general, the engine includes a turbine or turbine unit 11 which comprises a turbine wheel (not shown) carried by a shaft 12, the turbine being adapted to drive a compressor or compressor unit 13 which comprises one or more impellers (not shown) carried by the shaft 12. In the particular construction illustrated, the compressor 13 is indicated as having two stages although any desired number of stages may be employed. The compressor 13 is provided with a single-entry inlet 14 for air to be compressed thereby, and is provided with discharge or outlet ducts 15 respectively connected to combustion chambers 16, there being two combustion chambers in the particular construction illustrated although it will be understood that the present invention is not to be limited to use with an engine having two combustion chambers. The combustion chambers 16 are connected to the turbine 11 by ducts 17 which are adapted to convey to the turbine the combustion products necessary for the operation thereof.

Each combustion chamber 16 comprises an outer shell 20, which communicates with the corresponding duct 15, and an inner shell 21, which communicates with the corresponding duct 17, the inner shell of each combustion chamber being perforated to admit compressed air from the corresponding duct 15. Fuel is discharged into the inner shells 21 of the combustion chambers by nozzles 22 and mixes with the compressed air entering the inner shells through the perforations therein, the resulting fuel-air mixtures being ignited by devices 23. For example, the igniting devices 23 may be glow plugs, sparks plugs, or the like, which are connected to a suitable source of electricity in a manner not shown in Fig. 1 of the drawings. Preferably, the igniting devices are de-energized after starting, combustion of the fuel-air mixtures being self sustaining. The resulting combustion products flow through the ducts 17 leading to the turbine 11 and operate the turbine.

Fuel is delivered to the nozzles 22 by a pump 26 through a main fuel line 27 connected to the high pressure side of the pump, and through branch fuel lines 28 connected to the main fuel line and to the respective nozzles. Preferably, a spring biased check valve 29 for preventing delivery of fuel to the combustion chambers 16 until a predetermined minimum fuel pressure has been developed by the pump 26 is inserted in the main fuel line 27. Fuel is supplied to the pump 26 from a suitable source (not shown) through an inlet line 30 connected to the low pressure side of the pump. In the particular construction illustrated, the fuel pump 26 is driven by the turbine 11 through a shaft 33 which is operatively connected to the turbine shaft 12 by gearing 34 located in an accessory gear box 35.

With the construction shown in Fig. 1 of the drawings, the engine 10 may be employed to drive a device 36 which is connected to the turbine shaft 12, thus providing a mechanical power transmission as hereinbefore discussed. For example, the device 36 may be an alternating current generator, although it will be understood that various other devices may be mechanically connected to the turbine 11.

Considering the control system embodiment illustrated in Fig. 1 of the drawings, a fuel by-pass valve means 40 is connected in parallel with the fuel pump 26, the valve means 40 being connected to the main fuel line 27 leading from the high pressure side of the pump by a line 41 and being connected to the pump inlet line 30 leading to the low pressure side of the pump by a line 42. The by-pass lines 41 and 42 are interconnected through a pressure relief valve 43. The by-pass valve means 40 includes a valve casing 44 which is mounted on the gear box 35 in the construction illustrated and which is provided with a bore 45 therein for a reciprocable valve member or piston valve 46. The casing 44 is also provided with an annular recess 49 which communicates with the bore 45 and the high pressure by-pass line 41, and is provided with a cavity 50 adjacent one end of the bore 45 which communicates with the bore and the low pressure by-pass line 42. That portion of the bore 45 which is disposed between the recess 49 and the cavity 50 provides a seat 51 for the piston valve 46.

It will be apparent that as long as the piston valve 46 engages the seat 51, no fuel can be by-passed so that the rate of delivery of fuel to the combustion chambers 16 is equal to the rate of delivery of the pump 26. However, if the piston valve 46 is moved to the left, as viewed in Fig. 1 of the drawings, so that it disengages the seat 51 therefor, by-passing of fuel will occur to reduce the rate of delivery of fuel to the combustion chambers. The rate of by-passing and the consequent reduction in the rate of delivery of fuel to the combustion chambers depend upon the extent of such movement of the piston valve 46. As will be discussed in more detail in the following paragraphs, my control system includes means 52 responsive to the speed of the turbine 11 for varying the position of the piston valve 46 in a manner to maintain the rate of delivery of fuel to the combustion chambers 16 at a value which will result in substantially constant speed operation of the turbine 11 despite variations in the load on the turbine.

In the particular construction illustrated, the casing 44 of the by-pass valve means 40 is mounted on the accessory gear box 35 with the cavity 50 therein in registry with an opening 55 in the gear box, the speed responsive means 52 being disposed within the gear box in alignment with the opening 55. The speed responsive means comprises a bifurcated shaft 56 which is driven by the turbine shaft 12 through gearing 57. The bifurcated shaft 56 carries pivoted balls 58 which move outwardly as the speed of the turbine 11 increases, the balls 58 having connected thereto arms 59 which engage a head 60 on the outer end of a stem 61 which is connected at its inner end to the piston valve 46. As will be apparent, as the balls 58 swing outwardly in response to an increase in the speed of the turbine 11, the arms 59 connected thereto move the piston valve 46 to the left, as viewed in Fig. 1 of the drawings, so as to increase the rate of by-passing of the fuel, thereby decreasing the rate of delivery of fuel to the combustion chambers 16 in response to the increase in turbine speed.

Movement of the piston valve 46 by the speed responsive means 52 is opposed by a compression spring 64 which is disposed in a cavity 65 in the valve casing 44. One end of the spring 64 is seated against a head 66 on a stem 67 which is connected to the piston valve 46, and the other end of the spring is seated against a head 68 on a stem 69 which is secured to the valve casing, as by being threaded into an opening 70 therein.

It will be apparent that the extent to which the piston valve 46 is moved toward an open position by the speed responsive means 52 depends on the resistance offered by the spring 64. Consequently, the rate at which fuel is by-passed and the resulting rate at which fuel is delivered to the combustion chambers 16 depend on the spring force applied to the piston valve 46. Thus, in the final analysis, by controlling the rate of delivery of fuel to the combustion chambers, the spring 64 controls the turbine speed maintained by the speed responsive means 52.

In view of the foregoing, it will be apparent that the turbine speed may be maintained constant at various preselected values by applying appropriate spring forces to the piston valve 46 to vary the extent of its movement by the speed responsive means 52. The spring force may be varied by changing the spring 64, or by varying the position of the head 68 on which the spring 64 is seated with respect to the piston valve 46. In the particular construction illustrated, the spring force may be varied readily by varying the extent to which the stem 69 is threaded into the spring cavity 65, a lock nut 71 being threaded on the stem 69 to prevent a change in the spring force setting.

In order to prevent leakage of fuel from the cavity 50 into the gear box 35, a movable wall in the form of a diaphragm 74 fixed on the stem 61 and sealed with respect to the valve casing 44 is provided. A similar movable wall such as diaphragm 75 fixed on the stem 67 and sealed with respect to the valve casing 44 is employed to prevent leakage of fuel into the spring cavity 65.

Considering the operation of the embodiment if my invention illustrated in Fig. 1 of the drawings as thus far described, it will be apparent that the speed responsive means 52 will operate the by-pass valve means 40 to produce an increase in the rate at which fuel is by-passed in response to an increase in the speed of the turbine 11 above a predetermined operating speed, and to produce a decrease in the rate of by-passing of the fuel in response to a decrease in the speed of the turbine below the predetermined operating speed, the latter being determined by the spring force applied to the piston valve 46 by the spring 64. An increase in the rate of by-passing of the fuel produces a decrease in the rate of delivery of fuel to the combustion chambers 16 so that the energy available to operate the turbine 11 is decreased correspondingly, whereby the speed of the turbine is decreased. Conversely, a decrease in the rate of by-passing of the fuel in response to a decrease in the speed of the turbine produces an increase in the rate of delivery of fuel to the combustion chambers to increase the energy available to operate the turbine, whereby the speed of the turbine is increased to offset the decrease in its speed. Thus, by controlling the rate at which the fuel is by-passed around the pump 26, the speed responsive means 52 maintains the speed of the turbine 11 substantially constant in response to load variations at a value determined by the force applied to the piston valve 46 by the spring 64.

As a safety measure, I prefer to provide means, indicated generally by the numeral 76, for interrupting delivery of fuel to the combustion chambers 16 in the event of overspeeding of the turbine 11 for any reason. The interrupting means 76 includes a speed responsive device 77 which is driven by the pump shaft 33 in the particular construction illustrated, this device being similar to the speed responsive means 52 and being adapted to open a switch 78 whenever the speed of the turbine 11 exceeds a predetermined maximum value. The switch 78 is connected in series with a solenoid 79 which is adapted to hold a cut-off valve 80 in the pump inlet line 30 in its open position as long as the switch 78 is closed. A battery 81 in the circuit provides current for energizing the solenoid 79. It will be apparent that with this arrangement, if the turbine 11 accelerates above the predetermined maximum speed, the speed responsive device 77 opens the switch 78 to de-energize the solenoid 79, whereupon a spring 79' closes the cut-off valve 80 to interrupt delivery of fuel to the combustion chambers 16.

In order to prevent overheating of the turbine 11, I prefer to provide means, indicated generally by the numeral 84, for interrupting delivery of fuel to the combustion chambers 16 whenever the temperature of the combustion products supplied to the turbine exceeds a predetermined maximum value. In the particular construction illustrated, the interrupting means 84 includes a temperature responsive or thermal switch, shown diagrammatically and indicated by the numeral 85, which is also connected in series with the solenoid 79. Any suitable normally closed temperature responsive switch may be employed for the switch 85 and its structure is therefore not shown in detail. It will be apparent that if the temperature of the combustion products delivered to the turbine 11 from the combustion chambers 16 exceeds the predetermined maximum value, the thermal switch 85 will open to deenergize the solenoid 79 and permit closing of the cut-off valve 80, thereby interrupting delivery of fuel to the combustion chambers.

Excessive temperatures of the combustion products delivered to the turbine 11 may result if an excessive load is placed on the turbine. As previously discussed, if an excessive load is placed on the turbine 11, the speed responsive means 52 increases the rate of delivery of fuel to the combustion chambers 16 to maintain the turbine speed constant to take care of the additional load. However, since the compressor 13 is driven directly by the turbine 11 at substantially constant speed, the rate of delivery of air to the combustion chambers 16 will not increase. Consequently, an increased rate of delivery of fuel to the combustion chambers with no increase in the rate of delivery of air thereto increases the enthalpy of the combustion products delivered to the turbine, which means an increase in the temperature of the combustion products entering the turbine. The interrupting means 84 prevents damage to the turbine 11 from excessive combustion products temperatures.

Referring now to Fig. 2 of the drawings, I show an engine 110 which is substantially identical to the engine 10 described previously, the same reference numerals being used to identify like components of the engines 10 and 110. The only difference between the engines 10 and 110 is that, in the latter, the compressor 13 is provided with auxiliary discharge ducts 111 in addition to the discharge ducts 15 leading to the combustion chambers 16, the auxiliary discharge ducts being provided to permit bleeding off part of the air discharged by the compressor for use in driving pneumatically operable devices, such as air turbines, for example. In Fig. 2 of the drawings, I show an air turbine 112, such as may be used for auxiliary power purposes and the like, connected to one of the auxiliary discharge ducts 111 by a duct 113, a throttle 114 being disposed in the duct 113 to regulate the rate of delivery of air to the turbine 112. Any suitable means for controlling the throttle 114 may be provided, such as an actuator 115.

The foregoing arrangement provides a pneumatic transmission between the turbine 11 and the device driven thereby, part of the air discharged by the compressor 13 being utilized to perform useful work. The major portion of the air provided by the compressor is devoted to the operation of the turbine 11.

The control system for regulating the operation of the engine 110 includes all of the elements of the control system described previously in connection with the engine 10 and like reference numerals have been employed to designate like elements in both Figs. 1 and 2 of the drawings. Thus, the control system embodiment illustrated in Fig. 2 performs the same function as that illustrated in Fig. 1, i. e., it is adapted to regulate the operation of the engine 110 in response to turbine 11 speed variations and in response to the temperature of the combustion products. In addition, the control system illustrated in Fig. 2 of the drawings is adapted to modulate the action of the speed responsive means 52 in accordance with the load on the turbine 11 as will be discussed in more detail hereinafter.

In general, the control system embodiment illustrated in Fig. 2 of the drawings includes means for applying to the piston valve 46 a pressure force which varies with the load on the turbine 11 and, more specifically, includes pressure responsive means 117 for applying to the piston valve 46 a pressure force proportional to a pressure differential which varies with the external pneumatic loading of the compressor. The compressor discharge pressure is applied to the right side of the diaphragm 74, which is fixed on the valve stem 61, through air lines 118 and 119, the former being connected to the discharge side of the compressor and the latter communicating with a chamber 120 which is closed at one side by the diaphragm 74. The other side of the chamber 120 is closed by a wall 121 through which the valve stem 61 extends, suitable packing, or the like (not shown), being employed to prevent leakage from the chamber 120 into the gear box 35 along the stem 61. The high pressure air line 118 leading from the compressor 13 terminates in a metering orifice 124, or other pressure reducing device, the low pressure side of the orifice being connected to the spring cavity 65 by low pressure air lines 125 and 126. The low pressure side of the orifice 124 is also exposed to a suitable pressure which, in the particular construction illustrated, is the pressure obtaining in the duct 113 downstream from the throttle 114 controlling delivery of air to the air turbine or other pneumatically operable device 112. In this arrangement, the low pressure side of the orifice 124 is connected to the duct 113 downstream from the throttle 114 therein by an air line 127, the latter being connected at one end to the duct 113 and at its other end to the air line 125. Interposed in the line 127 between the orifice 124 and the duct 113 is a variable area flow restriction valve 131 which cooperates with the pressure responsive means 117 to idle the turbine 11 under conditions of no external pneumatic load on the compressor in a manner about to be described.

The control system illustrated in Fig. 2 of the drawings, as thus far described, contemplates using a compressor 13 which is designed to have good regulation, and wherein the discharge pressure is subject to only slight changes under normal torque load variations on the turbine 11. Now, if the throttle 114 controlling the delivery of air to the duct 113 and connected pneumatic load such as the turbine 112 is closed so as to cut-off the bleed from compressor 13, the compressor will be required to deliver less air and as a consequence the load torque on the turbine 11 will be reduced and the turbine 11 will therefore tend to speed up. Moreover, with the throttle 114 closed, the pressure obtaining in the duct 113 downstream from the throttle will be equal to, or substantially equal to, atmospheric pressure. Thus, a pressure differential between the discharge side of the compressor 13 and the duct 113 downstream from the throttle obtains, which pressure differential results in an increased flow condition of air through the line 118, the orifice 124, the line 125 and the line 127 having the valve 131 therein. Such air flow results in a pressure differential across the orifice 124, which pressure differential is applied to the piston valve 46 since the pressure on the high pressure side of the orifice acts in one direction on the diaphragm 74 and the pressure on the low pressure side thereof acts in the opposite direction on the diaphragm 75. The pressure differential applied to the diaphragms 74 and 75 tends to move the piston valve 46 to an open position, i. e., toward the left as viewed in Fig. 2 of the drawings, in opposition to the action of the spring 64, to cut down the fuel supply to the turbine 11 and reduce its speed. The force applied to the piston valve 46 by this pressure differential may be regarded as modulating the action of the spring 64 and, in effect, reduces the spring force applied to the piston valve.

The flow through the line 127 is adjusted by the valve 131 which is set to effect a predetermined idling speed of the turbine 11 when no external pneumatic load is applied to the compressor, i. e., when the throttle 114 controlling the device 112 is closed. More specifically, the flow resistance offered by the valve 131 is such that a predetermined rate of flow of air therethrough and through the orifice 124 obtains to produce a pressure differential across the orifice 124 which is commensurate with the desired idling speed for the turbine 11. This pressure differential modulates the spring force applied to the piston valve 46 so as to by-pass sufficient fuel to cause the turbine to idle. It will be apparent that the idling speed of the turbine 11 may be varied by varying the setting of the valve 131. For example, if it is desired to decrease the idling speed of the turbine 11, it is merely necessary to open the valve 131 slightly. This results in an increased flow through and an increased pressure differential across the orifice 124, and thus results in increased modulation of the spring force applied to the piston valve 46, thereby increasing the rate of by-passing of fuel and decreasing the rate of delivery of fuel to the combustion chambers 16. The latter results in a decreased idling speed for the turbine 11.

With the turbine 11 idling in the foregoing manner under conditions of no external pneumatic load, if an increased pneumatic load is applied to the compressor by opening the throttle 114, the compressor will be required to deliver a greater mass of air, thus increasing the driven load imposed on the turbine, and the control system illustrated in Fig. 2 of the drawings will accelerate the turbine 11 to a predetermined operating speed in a manner about to be described. Upon opening the throttle 114 controlling the delivery of compressed air to the device 112, it will be apparent that the pressure in the duct 113 downstream from the throttle will increase, thereby decreasing the pressure differential tending to produce flow through the line 118, the orifice 124, the line 125 and the line 127 having the valve 131 therein. Consequently, the flow through the orifice 124 decreases to decrease the pressure differential modulating the spring force applied to the piston valve 46, whereupon the latter is moved toward its closed position by the spring 64 to decrease the rate of by-passing of fuel and to increase the rate of delivery of fuel to the combustion chambers 16. This results in an increase in turbine 11 speed. The extent to which the turbine speed is increased depends on the extent to which the load is increased, e. g., on the extent to which the throttle 114 is opened. The speed responsive means 52 then maintains the turbine speed substantially constant at the level determined by the pressure responsive means 117, and, of course, limits the maximum speed of the turbine.

For additional control, I provide in the line 127 a valve 130 which may be termed a "load demand" valve. The valve 130 is normally open so that the control system illustrated in Fig. 2 of the drawings normally operates in the manner hereinbefore discussed. However, by closing the valve 130, maximum turbine 11 speed may be demanded at any time. It will be apparent that if the valve 130 is closed, no flow whatsoever through the orifice 124 can obtain so that no modulation of the spring force applied to the piston valve 46 exists. Consequently, upon closure of the valve 130, the valve 46 will be moved to the right by spring 64 to its extreme operative position in which the bypassed fuel is a minimum and more fuel will be supplied to the turbine, so that the turbine will operate at the maximum speed permissible by the speed responsive means 52. Any number of such "load demand" valves may be connected in series in the line 127, and closure of any one of the load demand valves will result in operation of the turbine 11 at maximum speed, irrespective of whether the turbine was operating previously under conditions of no load or partial load.

Considering a possible alternative to the arrangement illustrated in Fig. 2 of the drawings, if the line 127, instead of being connected to the duct 113 downstream from the throttle 114, is connected to a source of constant pressure, such as atmospheric pressure, the control system will operate somewhat differently. In order to permit venting the line 127 to atmospheric pressure, I have provided therein a selector valve 129. Assuming that the selector valve 129 is in a position to vent the line 127 to atmospheric pressure, it will be apparent that flow through the metering orifice 124 will obtain at all times as long as the engine 110 is operating with the load demand valve 130 open. Consequently, the turbine 11 will idle in the manner hereinbefore described. However, by closing the load demand valve 130, maximum turbine speed may be obtained at any time. Thus, with the line 127 vented to atmospheric pressure, the turbine 11 will idle with the valve 130 open and will operate at maximum speed with this valve closed.

A feature of the control system embodiment illustrated in Fig. 2 of the drawings resides in the provision of means 132 for preventing delivery of fuel to the combustion chambers 16 during starting of the engine 110 until a predetermined compressor discharge pressure has been developed, such pressure being sufficient to insure a supply of air to the combustion chambers 16 which is adequate to maintain combustion. For starting purposes, an electric starter 133, or other suitable starting device, is operatively connected to the turbine shaft 12, the starter 133 being energized in a manner to be described hereinafter. The flow preventing means 132 includes a housing 134 which contains a diaphragm 135, one side of the diaphragm being exposed to compressor discharge pressure through a line 136 connected to the line 118 leading from the discharge side of the compressor, and the other side of the diaphragm being exposed to atmospheric pressure. The diaphragm 135 is adapted to operate a switch 137 through a stem 138, the switch 137 normally being held open by a spring 139 which engages the diaphragm. It will be apparent that when the pressure of the air discharged by the compressor 13 reaches a value sufficient to overcome the force exerted on the diaphragm 135 by the spring 139, the pressure acting on the diaphragm will close the switch 137. The latter is connected in series with the solenoid 79 controlling the cut-off valve 80 so that when the switch 137 is closed in the foregoing manner, the solenoid is energized to open the cut-off valve and permit delivery of fuel to the combustion chambers 16. Thus, no fuel can be delivered to the combustion chambers until the compressor discharge pressure rises above a predetermined minimum value, which is a feature of the invention.

In Fig. 2 of the drawings I show a starter and ignition circuit which may be used in connection with either the engine 10 or the engine 110, this circuit including the starter 133 which, as previously indicated, is operatively connected to the turbine shaft 12, as by gearing 142. In series with the starter 133 is a normally open switch 143 which is adapted to be closed by a relay 144, the switch 143 being connected in series with the battery 81. The relay 144 is connected in series with the battery through a manually operable selector switch comprising a switch arm 145 having an arcuate contact 146 thereon which is adapted to engage contacts 147 and 148, the switch arm being movable to a position wherein the contact 146 engages the contacts 147 and 148 simultaneously, or to a position wherein the contact 146 engages the contact 148 alone. Also, the switch arm is movable to an "off" position, shown in Fig. 2, wherein the contact 146 is out of engagement with the contacts 147 and 148. When the contact 146 engages the contacts 147 and 148, the relay 144 is energized to close the switch 143 so as to energize the starter 133, the latter then driving the turbine 11 and the compressor 13.

The igniting devices 23 are connected in parallel through fuses 149 and are connected in series with the contact 147 through a resistor 150 so that the igniting devices are energized whenever the contact 146 engages the contact 147. Preferably, the relay 144 controlling the starting switch 143 is provided with a time delay to permit warming up of the igniting devices 23 before the starter is energized in the event glow plugs, or the like, are used for the igniting devices. The rating of the fuses 149 is such that if one is blown, or if one of the igniting devices 23 fails to draw current for any reason, the other fuse will blow since, because of the presence of the resistor 150, the current in the closed circuit will increase sufficiently to blow the fuse therein. Thus, this insures that neither igniting device 23 will be energized if one of the igniting devices, or the circuit connected thereto, is inoperative for any reason, this precaution being desirable to prevent combustion in only one chamber of the turbine unit.

When the contact 146 on the selector switch arm 145 engages the contact 148, the circuit through the thermal switch 85, the pressure responsive switch 137, the overspeed switch 78 and the solenoid 79 is prepared for energization. Thus, in starting the engine, as soon as the compressor discharge pressure rises to a value sufficient to close the switch 137, fuel will be delivered to the combustion chambers 16 and will be ignited by the devices 23. After starting, the switch arm 145 may be moved to a position such that the contact 146 thereon engages only the contact 148 so as to de-energize the starter 133 and the igniting devices 23, combustion in the chambers 16 being self-sustaining.

Although I have disclosed exemplary embodiments of my invention herein for purposes of illustration, it will be understood that various changes, modifications and substitutions may be incorporated therein without necessarily departing from the spirit of the invention, and I hereby reserve the right to all such changes, modifications and substitutions as properly come within the scope of the invention as set forth in the appended claims.

I claim as my invention:

1. In a control system for a combustion engine having a compressor connected thereto, the combination of: a bleed air duct for conducting discharge air from said compressor to a point of use; a throttle valve in said duct for controlling the rate of delivery of air by said duct; means for delivering fuel through a flow path to the engine; a fuel valve in said flow path for controlling the rate of delivery of fuel to the engine; means biasing said fuel valve in a valve closing direction; an air line having its ends respectively connected on opposite sides of said throttle valve; means in said line defining a restricted orifice adapted under flow to establish a pressure differential between its ends, said pressure being varied in response to changes in the position of said throttle valve; movable wall means operatively connected to move said fuel valve; means subjecting said wall means to said differential pressure in a direction to move the fuel valve in an opening direction; and a valve in said line between said orifice and the line end connected to the downstream side of said throttle valve for adjustably modulating the differential pressure level acting on said movable wall.

2. In a control system for a combustion engine having a compressor connected thereto, the combination of: a bleed air duct for conducting discharge air from said compressor to a point of use; a throttle valve in said duct for controlling the rate of delivery of air by said duct; means for delivering fuel through a flow path to the engine; a fuel valve in said flow path for controlling the rate of delivery of fuel to the engine; means biasing said fuel valve in a valve closing direction; an air line having its ends respectively connected on opposite sides of said throttle valve; means in said line defining a restricted orifice adapted under flow to establish a pressure differential between its ends, said pressure being varied in response to changes in the position of said throttle valve; movable wall means operatively connected to move said fuel valve; means subjecting said wall means to said differential pressure action in a direction to move the fuel valve in an opening direction; speed responsive means for actuating said valve in response to speed fluctuations of said combustion engine; and valve means in said line for modulating said differential pressure to adjust the idling speed of said engine.

3. In a control system for a combustion engine having a compressor connected thereto, the combination of: a bleed air duct for conducting discharge air from said compressor to a point of use; a throttle valve in said duct for controlling the rate of delivery of air by said duct; means for delivering fuel through a flow path to the engine; a fuel valve in said flow path for controlling the rate of delivery of fuel to the engine; means biasing said fuel valve in a valve closing direction; an air line having its ends respectively connected on opposite sides of said throttle valve; means in said line defining a restricted orifice adapted under flow to establish a pressure differential between its ends, said pressure being varied in response to changes in the position of said throttle valve; movable wall means operatively connected to move said fuel valve; means subjecting said wall means to said differential pressure action in a direction to move the fuel valve in an opening direction; speed responsive means for actuating said valve in response to speed fluctuations of said combustion engine; and a valve for opening and closing to flow the end of said line associated with the downstream side of said throttle valve.

4. In a control system for a combustion engine having a compressor connected thereto, the combination of: a bleed air duct for conducting discharge air from said compressor to a point of use; a throttle valve in said duct for controlling the rate of delivery of air by said duct; means for delivering fuel through a flow path to the engine; a fuel valve in said flow path for controlling the rate of delivery of fuel to the engine; means biasing said fuel valve in a valve closing direction; an air line having its ends respectively connected on opposite sides of said throttle valve; means in said line defining a restricted orifice adapted under flow to establish a pressure differential between its ends, said pressure being varied in response to changes in the position of said throttle valve; movable wall means operatively connected to move said fuel valve; means subjecting said wall means to said differential pressure action in a direction to move the fuel valve in an opening direction; speed responsive means for actuating said valve in response to speed fluctuations of said combination engine; and a valve for disconnecting the end of said line associated with the downstream side of the throttle valve and connecting it with atmosphere, and vice versa.

References Cited in the file of this patent

UNITED STATES PATENTS

| | | |
|---|---|---|
| 835,388 | Berg | Nov. 6, 1906 |
| 1,214,718 | Schweitzer | Feb. 6, 1917 |
| 1,510,688 | La Fon | Oct. 7, 1924 |
| 1,874,136 | Standerwick | Aug. 30, 1932 |
| 1,950,787 | Ellingham | Mar. 13, 1934 |
| 2,003,478 | Bovard | June 4, 1935 |
| 2,010,960 | Pogue | Aug. 13, 1935 |
| 2,038,442 | Pateras Pescara | Apr. 21, 1936 |
| 2,078,956 | Lysholm | May 4, 1937 |
| 2,078,957 | Lysholm | May 4, 1937 |
| 2,115,921 | Steiner | May 3, 1938 |
| 2,147,935 | Steiner | Feb. 21, 1939 |
| 2,200,892 | Pateras Pescara | May 14, 1940 |
| 2,280,765 | Anxionnaz et al. | Apr. 21, 1942 |
| 2,324,451 | Wood | July 13, 1943 |
| 2,330,558 | Curtis | Sept. 28, 1943 |
| 2,336,232 | Doran | Dec. 7, 1943 |
| 2,341,257 | Wünsch | Feb. 8, 1944 |
| 2,405,888 | Holley | Aug. 13, 1946 |
| 2,411,065 | Silvester | Nov. 12, 1946 |
| 2,422,808 | Stokes | June 24, 1947 |
| 2,424,610 | Goddard | July 29, 1947 |
| 2,446,523 | Bradbury et al. | Aug. 10, 1948 |
| 2,450,535 | Watson et al. | Oct. 5, 1948 |
| 2,465,159 | Lee | Mar. 22, 1949 |
| 2,467,513 | Welsh | Apr. 19, 1949 |
| 2,469,678 | Wyman | May 10, 1949 |
| 2,476,218 | Prime et al. | July 12, 1949 |
| 2,508,260 | Holley | May 16, 1950 |
| 2,540,642 | Allen et al. | Feb. 6, 1951 |
| 2,545,703 | Orr | Mar. 20, 1951 |
| 2,550,678 | Deacon | May 1, 1951 |
| 2,570,591 | Price | Oct. 9, 1951 |
| 2,585,200 | Welsh | Feb. 12, 1952 |
| 2,599,480 | Pfenninger | June 3, 1952 |
| 2,612,944 | Orr | Oct. 7, 1952 |
| 2,688,841 | Decher et al. | Sept. 14, 1954 |

FOREIGN PATENTS

| | | |
|---|---|---|
| 371,093 | Great Britain | Apr. 21, 1932 |
| 531,997 | Great Britain | Jan. 15, 1941 |
| 862,495 | France | Dec. 9, 1940 |
| 941,556 | France | July 19, 1948 |